United States Patent Office 3,278,592
CONTINUOUS OXIDATION OF AROMATIC COMPOUNDS HAVING OXIDIZABLE SIDE CHAINS
Hans Moell and Adolf Kreyer, Ludwigshafen (Rhine), and Hans Soenksen, Limburgerhof, Pfalz, Germany, assignors to Badische Anilin- & Soda-Fabrik Aktiengesellschaft, Ludwigshafen (Rhine), Germany
Filed Mar. 14, 1962, Ser. No. 179,738
Claims priority, application Germany, Mar. 15, 1961, B 61,698
4 Claims. (Cl. 260—524)

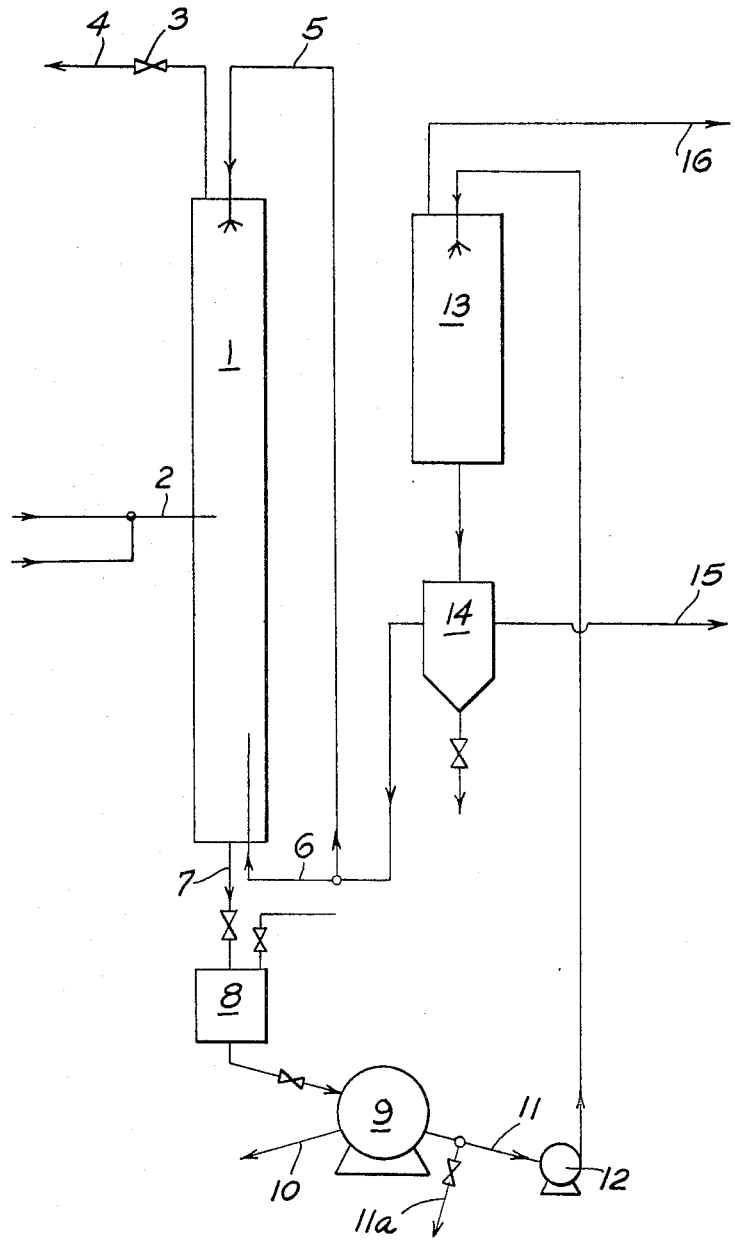

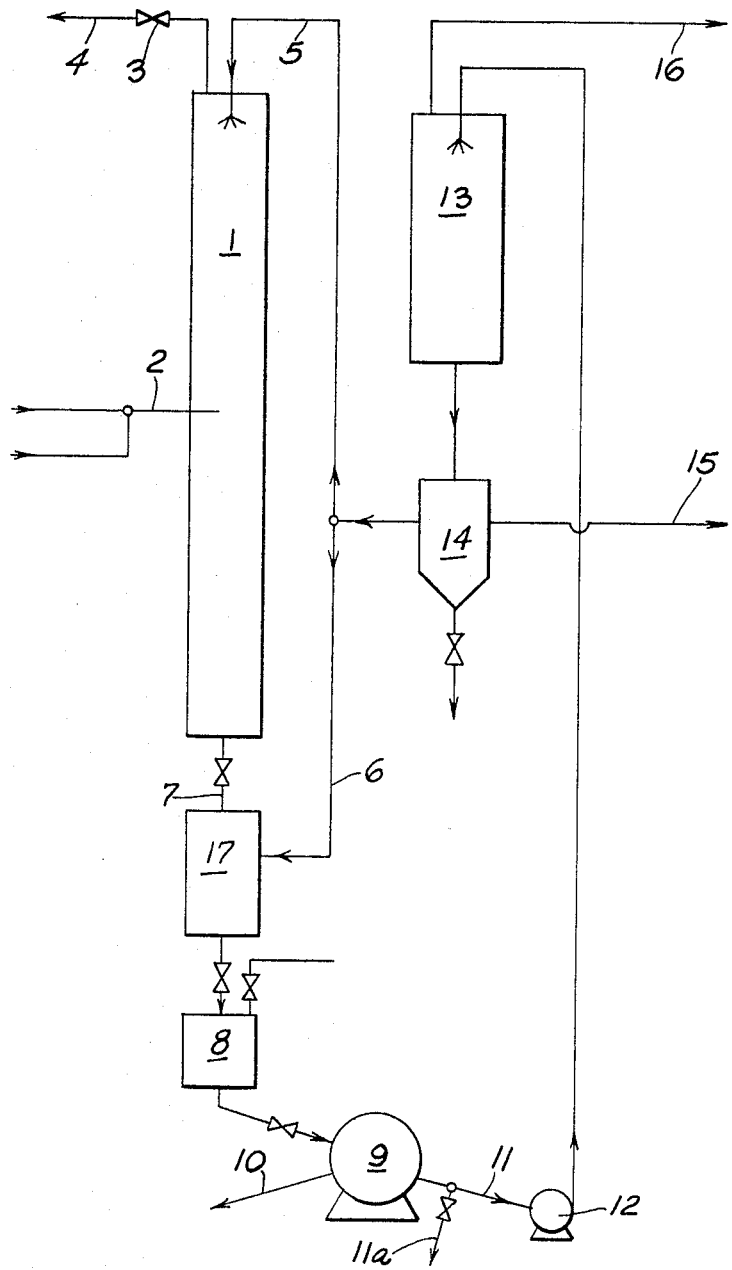

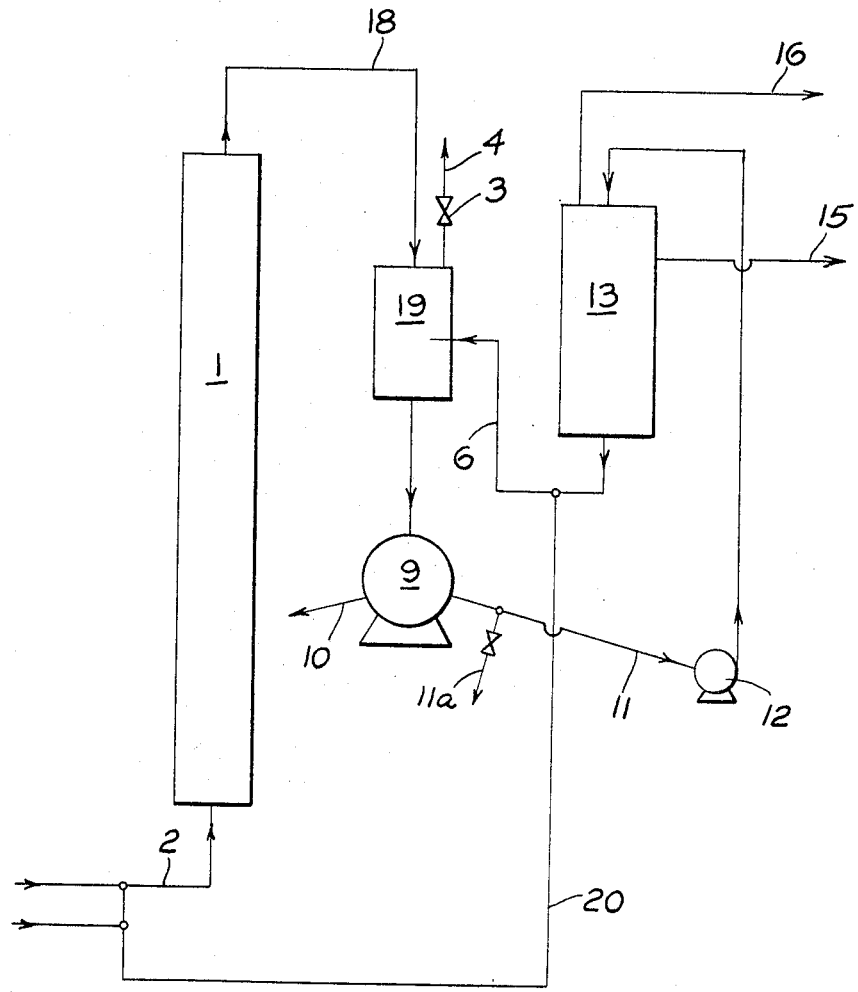

This invention relates to an improved process for the production of benzenecarboxylic and pyridinecarboxylic acids by the oxidation of benzene or pyridine compounds containing oxidizable side chains with nitric acid. More specifically the invention relates to a novel manner of cooling the reaction products.

Numerous methods have heretofore been known for the oxidation of aromatic compounds containing oxidizable side chains by means of dilute, preferably 4 to 40%, nitric acid at elevated temperature, for example at 100° to 360° C., under pressure, for example at 10 to 150 atmospheres. The oxidation by these methods is usually carried out in vertical reactors by introducing the reactants simultaneously at the bottom end and withdrawing the reaction products at the top, or by introducing the reactants approximately at the middle of the reactor and withdrawing the insoluble oxidation products and very dilute nitric acid at the bottom and the reaction gas at the top. It has also been proposed to carry out the oxidation in a horizontal tubular reactor, the reaction products being fed in at one end and the reaction products been withdrawn at the other end. The methods differ in principles in that either the gases formed in the oxidation are removed from the reaction chamber together with the liquid and solid reaction products, or that the gases formed are separated from the liquid and solid products within the oxidation chamber. In either case, the hot oxidation solution has to be cooled and the dilute nitric acid has either to be concentrated or discarded after neutralization. Cooling may be effected in various ways. With external cooling useful technical results can be obtained only with very small plants. In the conventional processes direct cooling is therefore achieved by evaporation (reflux cooling) or by pumping in cold water. For the recovery of nitric acid various methods have already been proposed, for example simple evaporation of the filtrate or absorption of the reaction gases containing nitric oxide by the filtrate, which may have been first concentrated. The conventional methods have shortcomings however; when reflux cooling is used, crystal suspensions are very readily obtained and these cause stoppages in the pipe system; when cooling is effected by pumping in cold water, a crystal pulp is obtained which contains only 2 to 3% of solids and the nitric acid obtained after filtration is very dilute.

It is an object of the present invention to provide a process for the production of benzenecarboxylic and pyridinecarboxylic acids by oxidation of benzene and pyridine compounds containing oxidizable side chains by means of nitric acid in which the carboxylic acids are obtained in higher yields than by the conventional methods. Another object of the invention is to provide a process in which the nitric acid used for the oxidation of benzene or pyridine compounds having oxidizable side chains is more effectively utilized. Another object of the invention is to provide a process for the oxidation of benzene and pyridine compounds containing oxidizable side chains in which, with the degree of oxidation being alike, the nitric acid, after filtering off the solids, is obtained in higher concentration and therefore in better condition for reuse than by the conventional methods. Another object of the invention is to provide a process for the oxidation of compounds containing oxidizable side chains with nitric acid in which the risk of the reactor being incrusted and of the pipe system being clogged by crystallized carboxylic acids is substantially precluded.

For a fuller understanding of the invention the object and advantages thereof, reference may be had to the following description taken in connection with the accompanying drawing which diagrammatically represents arrangements of apparatus in which the invention can be carried out.

We have found that carboxylic acids are obtained from benzene and pyridine compounds which contain one to three oxidizable side chains and may also contain inert substituents, by oxidation with nitric acid, preferably nitric acid of from 10 to 40% strength, at elevated temperature, preferably between 240° and 310° C., and at increased pressure, preferably between 50 and 100 atmospheres, without any of the shortcomings attached to the conventional-type processes being encountered by cooling the reaction product by admixing therewith part of the cooled filtrate obtained by separating the solid reaction product, after further cooling if required, and returning part of the filtrate to the reactor.

In processes in which the separation of the gaseous reaction products is carried out in the reaction chamber, the hot suspension, for example, which contains the oxidation products may be withdrawn, brought into a separate cooling container without the pressure being appreciably changed, filtering, advantageously after decompression, further cooling the filtrate if necessary, for example by evaporative cooling or by indirect cooling, and then returning a portion of the filtrate to the cooling container and supplying the other portion for the recovery of nitric acid. It is not necessary, however, to use a separate cooling container, for the cold filtrate may also be directly introduced into the lower part of the oxidation chamber so that a temperature drop is produced in the reaction chamber. It is understood that both measures may also be carried out at the same time, i.e., the cold filtrate may be returned both to the lower part of the reaction chamber and into a cooling container for the suspension. It is also advantageous to utilize the returned filtrate for cooling the nitrogen oxides containing gases formed in the reaction.

In oxidation processes in which the oxidation and the reduction products are withdrawn commonly, the reaction mixture, after leaving the oxidation zone but before decompression must be cooled by pumping in cold filtrate. Mixing may be carried out, for example, in a cooling container or in a mixing section.

In all cases it is advantageous to coemploy the filtrate, which still contains a few percent of nitric acid, in the production of the nitric acid required for the oxidation, by adjusting nitric acid of higher concentration to the concentration required for the oxidation by admixing an appropriate proportion thereof with the filtrate.

The process will now be described in greater detail with reference to the accompanying diagrammatic drawings. In the embodiment of the process in accordance with FIGURE 1 a mixture of the compound to be oxidized and dilute nitric acid, which may be preheated, is introduced into a pressure tight reactor 1 through a pipe 2. As soon as the reaction between nitric acid and the hydrocarbon or the compound to be oxidized has been initiated in reactor 1, for example by heating for a short time or by blowing in steam, the pressure and, as a result, the temperature in reactor 1 are controlled by means of valve 3. In general the oxidation temperature is between 200° and 350° C., preferably between 240° and 310° C., and the pressure is between 15 and 120 atmospheres, preferably between 50 and 100 atmospheres. The oxidation chamber is filled to about half or up to two-thirds with liquid or suspension. Cooled filtrate is fed through pipe 5 into the upper part of reactor 1 to cool the off-gas. This leaves reactor 1 through valve 3 and line 4 and may be used for the production of nitric acid. Cooled filtrate is also pumped into the lower part of reactor 1 through line 6. At the same time, reaction mixture, consisting of dilute nitric acid and suspended carboxylic acid, is withdrawn from the bottom part of reactor 1 through line 7 and expanded into an intermediate vessel 8, the reaction being thus cooled. Vessel 8 serves at the same time as a surge drum ahead of a centrifuge or filter 9. On the filter the filtered material may, if desired, be washed with suitable solvents or water. The washings may be united with the filtrate or may be removed separately. The solid substance is discharged at 10 while the filtrate passes through line 11 and pump 12 into vessel 13. When the washings are withdrawn separately, this can be done through line 11a. Further cooling is effected in vessel 13, for example by indirect or by evaporative cooling at reduced pressure, the vapors leaving through line 16. Small amounts of solids subsequently deposited upon cooling, may be removed in a solids separator 14. The solids separator may be, for example, a simple settling vessel, from which the solid sediment is removed periodically, or a vessel, from which a pure filtrate can be withdrawn by means of a filter candle, the crystal pulp which remains in the vessel being withdrawn periodically, if required, after backflow rinsing of the filter candle. It is advantageous to convey the crystal suspension, which is periodically removed from separator 14, to the filter 9 by way of surge drum 8. The filtrate is then passed partly through line 6 into the lower part of reactor 1 and partly through line 5 into the upper part of reactor 1. That part of the filtrate which is not to be recycled is withdrawn at any point between the filter and the solids separator 14 through line 15.

In the process illustrated in FIGURE 2, cooling of the reaction mixture by admixture with the filtrate takes place in a separate cooling vessel 17 rather than in the lower part of the reactor. In this case the reaction mixture leaves the reactor hot, is mixed with the filtrate supplied through line 6 in vessel 17 with the mixing temperature thus being set up, then expanded into vessel 8, thus being further cooled, and is then supplied to filter 9. The further procedure is as in FIGURE 1.

FIGURE 3 illustrates a process in which the reaction products (including the reaction gas) are removed from the reaction zone together. The aromatic compounds to be oxidized are introduced into reactor 1 together with nitric acid through line 2. Oxidation takes place in reactor 1 at about 240° to 310° C. and a pressure of 50 to 100 atmospheres, and the hot reaction products are passed through line 18 into vessel 19 where cooling is effected by mixing with cold filtrate. Simultaneously, or more advantageously subsequently, expansion is effected and the mixture is filtered in filter 9. The filtrate is collected in vessel 13, further cooled therein, and then returned through line 6 partly for cooling the reaction products in vessel 19 and partly through line 20 for dilution of the nitric acid used as initial material; the excess is passed to further processing through line 15.

The ratio between the portion of the filtrate which is used for cooling the reaction product and for return to the oxidation zone, and the portion which is passed to further processing, depends on various factors, for example on the temperature of the cooled filtrate, the extent of cooling intended in mixing and the desired nitric acid concentration in the filtrate. For example, with a filtrate cooled to 30° C. and a reaction product at a temperature of 270° C., a mixing temperature of 90° C. is achieved by cooling with 3 parts of filtrate to one part of reaction product, and when the stationary state has been reached, the nitric acid concentration in the filtrate is 14%.

The amount of liquid withdrawn from the system must of course be equal to the amount supplied. However, since a high proportion of filtrate used for cooling and subsequent recycling makes repeated cycling possible, the ratio of filtrate used for cooling and returned for reuse and filtrate withdrawn from the cycle may vary within wide limits. In general, 50 to 90% of the filtrate is used for cooling and reuse, and 50 to 10% is withdrawn for further processing. In other words half or more, up to nine-tenths of the filtrate is used for cooling and recycling. The temperature of the filtrate is lowered to about 20° to 50° C. The mixing of the reaction solution with the filtrate is carried out at a temperature of between 70° and 130° C., advantageously 80° and 110° C. These data allow of determining the relative proportions of recycled filtrate and reaction mixture by calculation. The concentration of nitric acid in the filtrate is then about 8 to 16%.

Otherwise the operating conditions are the same as in oxidations with nitric acid.

The oxidation can be carried out in the presence or absence of conventional oxidation catalysts, as for example the oxides or salts of metals of Groups IVA, IIB, VB, VIIN and VIII of the periodic system. Suitable catalysts are for example mercury nitrate, vanadium pentoxide, molybdenum trioxide, tungsten trioxide, chromic nitrate, ferric nitrate, nickel nitrate and ammonium vanadate. The catalyst may be supplied for example continuously with the nitric acid. The presence of a catalyst is however not essential for the success of the reaction.

It is also possible to introduce oxygen containing gases into the reaction chamber together with the nitric acid, but this is not of substantial importance for the oxidation either.

Nitric acid is fed at a concentraton of 10 to 40% by weight, advantageously 15 to 35% by weight. This nitric acid is advantageously prepared by mixing part of the filtrate obtained by filtering off solid carboxylic acid after completion of the oxidation with nitric acid of a concentration higher than 40%.

The relative proportion of the nitric acid feed to the substance to be oxidized depends on the number of oxidizable side chains and on the concentration of the nitric acid. Since oxidation of a methyl group proceeds according to the reaction equation:

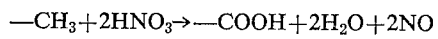

$$-CH_3 + 2HNO_3 \rightarrow -COOH + 2H_2O + 2NO$$

the minimum amount of nitric acid required is that calculated on the basis of this equation. In general, however, an excess of nitric acid beyond the stoichiometric amount is used because consumption of nitric acid is increased by said reactions. Moreover, oxidation will not be carried on to the point of complete consumption of the nitric acid.

Suitable oxidizable compounds are mononuclear compounds of aromatic character which belong to the benzene or pyridine series and which moreover contain one to three oxidizable chains and $(x-1)$ inert groups or atoms, $x$ being a whole number of from 1 to 3 inclusive. In the preferred compounds, the oxidizable side chains contain one to four carbon atoms and are present at alkyl or alkenyl groups; the compounds may, however, be partly oxidized and contain for example hydroxy, aldehyde or keto groups. The oxidizable side chains may, however, also contain halogen atoms, for example, chlorine atoms.

Examples of suitable compounds are: methylbenzenes, ethylbenzenes, n-propylbenzenes, isopropylbenzenes, n-butylbenzenes, sec.-butylbenzenes, dimethylbenzenes, diethylbenzenes, di-n-propylbenzenes, di-isopropylbenzenes, di-n-butylbenzenes, di-sec.-butylbenzenes, trimethylbenzenes, triethylbenzenes, tri-n-propylbenzenes, tri-isopropylbenzenes, tri-n-butylbenzenes, tri-sec.-butylbenzenes, ethyltoluenes, isopropyltoluenes, cymene, ethyl-n-propyltoluenes, ethylisopropyltoluenes, ethyl-sec.-butyltoluenes, diethyltoluenes, diethyl-n-propyltoluenes, n-propylethylbenzenes, isopropylethylbenzenes, n-butylethylbenzenes, sec.-butylethylbenzenes, dimethylethylbenzenes, di-n-propylethylbenzenes, di-isopropylethylbenzenes, di-n-butylethylbenzenes, di-sec.-butylethylbenzenes, isopropyl-n-propylbenzenes, n-butyl-n-propylbenzenes, sec.-butyl-n-propylbenzenes, dimethyl-n-propylbenzenes, di-isopropyl-n-propylbenzenes, di-n-butyl-n-propylbenzenes, n-butylisopropylbenzenes, sec.-butylisopropylbenzenes, dimethylisopropylbenzenes, diethylisopropylbenzenes, di-isopropylbenzenes, di-n-propylisopropylbenzenes, di-sec.-butylisopropylbenzenes, isobutyl-n-butylbenzenes, dimethylisobutylbenzenes, diethylisobutylbenzenes, di-n-propylisobutylbenzenes, di-isopropylisobutylbenzenes, di-n-butylisobutylbenzenes, di-sec.-butylisobutylbenzenes, dimethyl-sec.-butylbenzenes, diethyl-sec.-butylbenzenes, di-n-propyl-sec.-butylbenzenes, di-isopropyl-sec.-butylbenzenes, di-n-butyl-sec.-butylbenzenes, benzyl alcohol, benzaldehyde, toluyl alcohols, tolualdehydes, toluketones, acetophenone, $\alpha$-hydroxyethylbenzenes, hydroxymethylbenzyl alcohols, hydroxymethylbenzaldehydes, hydroxymethyltoluyl carboxylic acids, benzyl chloride, xylylene chloride, benzal chloride, xylylene dichloride, $\alpha$- and $\beta$-picolines, lutidines and collidines.

The benzene and pyridine compounds may also contain on the ring one or two groups or atoms which are inert under the reaction conditions, as for example halogen atoms, especially chlorine and bromine atoms, nitro groups, carboxylic acid groups or sulfonic acid groups. Examples of such compounds are chlorotoluenes, bromotoluenes, nitroxylenes, chloroxylenes, toluic acids, phthalaldehyde carboxylic acids, xylenesulfonic acids, chloropicolines and chlorolutidines.

By the process according to this invention the yields of carboxylic acid are increased and the consumption of nitric acid is decreased at the same time. Moreover, the off-gas, if cooled by the injection of cooled filtrate, contains up to 75% of NO and $NO_2$ along with a decreasing proportion of nitrogen and dinitrogen monoxide. The process according to this invention also allows of processing the filtrate into re-usable nitric acid in a relatively simple manner because a filtrate with a higher nitric acid content is obtained. It must be regarded as surprising that after the filtrate has been recycled the carboxylic acid obtained is just as pure as when cooling is effected with water and the carboxylic acid has been obtained from a very dilute nitric acid.

The invention is further illustrated by, but not limited to, the following examples.

*Example 1*

With reference to FIGURE 1, a mixture preheated to 110° C. of 80 liters of p-diisopropylbenzene and 720 liters of 40% nitric acid is continuously pumped per hour through line 2 into reactor 1 which is a tube 7.5 meters in length and 120 millimeters in diameter made of chromium nickel steel and lined with tantalum, the pressure in reactor 1 being maintained at 80 atmospheres gauge by means of valve 3 in the off-gas line 4. When the reaction has set in, a temperature of 260° to 280° C. is set up in the oxidation zone. 380 liters per hour of filtrate having a temperature of 30° C. is sprayed into the top of reactor 1 through line 5 to cool the off-gas. 100 m.$^3$ (S.T.P.) per hour of off-gas leave reactor 1 through line 4 at about 60° C. This off-gas has the following composition:

46.6% of NO
24.6% of $NO_2$
1.0% of $N_2O$
4.3% of $N_2$
4.4% of CO
19.1% of $CO_2$

To cool the reaction mixture, 2480 liter per hour of filtrate with a temperature of 30° C. is pumped into reactor 1 from below through line 6. About 3660 liters of reaction mixture leave reactor 1 at its lower end at about 100° C. through line 7 and after decompression at atmospheric pressure in vessel 8 are separated in centrifuge 9 into solid crude terephthalic acid (60 kg. per hour with 50 to 60 kg. water content) which is discharged through line 10 and a nitric acid filtrate of about 12 to 15% strength. On centrifuge 9 the terephthalic acid is washed with 400 liters per hour of water of 80° C. The washings are discarded. 3540 liters per hour of a filtrate leave the centrifuge at a temperature of about 70° C. and are passed through line 11 and pump 12 into vessel 13 where the filtrate is cooled to about 30° C. by reflux cooling at a pressure of about 40 mm. Hg. The cooled filtrate is passed through solids separator 14 and partly recycled through lines 5 and 6 to reactor 1 while 545 liters per hours of filtrate leave the system through line 15. 135 kg. per hour of water vapor are withdrawn through line 16 during vacuum cooling. Any solid product settling in vessel 14 may be removed periodically.

*Example 2*

In a manner similar to that in Example 1 and in an apparatus corresponding to that illustrated in FIGURE 1, 400 liters per hour of diisopropylbenzene is oxidized with 3500 liters per hour of 407 nitric acid at a pressure of 65 atmospheres and a temperature of 260° C. 1800 liters per hour of filtrate is sprayed into the upper part of reactor 1 through line 5 at a temperature of 32° C. 500 m.$^3$ (S.T.P.) of off-gas of about 55° C. leave the reactor through line 4. The off-gas has the following composition:

58.0% of NO
14.0% of $NO_2$
0.9% of $N_2O$
4.0% of $N_2$
4.0% of CO
19.1% of $CO_2$ 13,000 liters per hour of filtrate is pumped into the lower part of reactor 1 through line 6 at a temperature of 32° C. to cool the reaction mixture. 18,000 liters per hour of reaction mixture is withdrawn through line 7 at a temperature of 98° C. and, after decompression in vessel 8, separated on vacuum rotary filter 9 into solid crude terephthalic acid and a filtrate having a content of 12 to 15% of nitric acid. The terephthalic acid is washed with 1000 liters of water, the washings being discarded. 16,800 liters of nitric acid filtrate and 480 kg. of moist terephthalic acid, containing 290 kg. of dry terephthalic acid, is obtained per hour. The nitric acid filtrate leaves the filter at a temperature of 62° C. and are cooled to about 32° C. in vessel 13 by reflux cooling at a pressure of 45 mm. Hg. The cooled filtrate is passed through solids separator 14, constructed as a filter candle and partly returned through lines 5 and 6 to reactor 1, while 15,900 liters per hour of filtrate leave the system through line 15. As soon as the resistance to passage through the filter candle in the solids separator 14 becomes too great (more than 1.8 atmospheres gauge), the filter candle is purged free by backflow (through a line not shown) and the crystal suspension thus obtained is transferred to vessel 8 and passed through filter 9.

*Example 3*

With reference to FIGURE 3, a mixture preheated to 150° C. of 100 kg. of p-xylene and 1270 kg. of nitric acid of 24.2% by weight strength is fed per hour into reactor 1 from below through line 2. The nitric acid is obtained by mixing 962 kg. of 30.3% nitric acid with 380 kg. of a 10% nitric acid solution coming from the filtrate cooler 13 through line 20. The temperature of reactor 1 is 265° C. and the pressure is 75 atmospheres gauge. The reaction products pass into vessel 19 where the gaseous products containing water vapor are separated from the slurry. 303 kg. of oxides of nitrogen and water vapor per hour leave vessel 19 through valve 3 and line 4. 2400 kg. per hour of filtrate containing 10% of nitric acid is pumped at a temperature of 33° C. into the lower part of vessel 19 and mixed with the slurry therein so that the solution after decompression, has a temperature of 85° C. at the point where it leaves for vacuum filter 9. 125 kg. of terephthalic acid per hour are obtained on the filter. The terephthalic acid is washed in cake form with 800 liters per hour of water and the washings are discarded. The mother liquor is withdrawn from the filter separately and then cooled to 33° C. in vessel 13 in vacuo. From vessel 13, after the solids have been separated, 2400 kg. of mother liquor is withdrawn per hour through line 6 and 380 kg. of mother liquor which contains small amounts of terephthalic acid, p-nitrobenzoic acid, nitroterephthalic acid and picric acid, but no hydrocarbons, and in addition contains 10% of nitric acid, is withdrawn through pipe 20. The remainder, 152 kg. per hour of mother liquor, is passed to further processing. During cooling, 270 kg. per hour of water vapor are withdrawn through line 16.

What we claim is:

1. In a continuous process for the oxidation of cyclic mononuclear compounds of aromatic nature selected from the class consisting of benzene and pyridine derivatives, said compounds containing 1 to 3 oxidizable side chains with 1 to 4 carbon atoms and $(x-1)$ inert groups wherein $x$ stands for an integer from 1 to 3, with nitric acid at a temperature of 100° to 360° C. and a pressure of 10 to 100 atmospheres, wherein the solid reaction product is separated after cooling, the improvement of cooling the reaction product to a temperature within the range of 70° C. to 130° C. by admixing with it from 50% to 90% of the filtrate which is obtained after the separation of the solid reaction product and withdrawing that portion of the filtrate that is not used for cooling.

2. In the process as claimed in claim 1 the improvement of further cooling the filtrate prior to using it for cooling the reaction product.

3. In the process as claimed in claim 1 the improvement which comprises: recycling part of the portion of the filtrate that is not used for cooling the reaction product together with the reactants and discarding another part of that portion of the filtrate that is not used for cooling the reaction product.

4. In the process as claimed in claim 1 the improvement of cooling the off-gases with a portion of said cooled filtrate.

References Cited by the Examiner

UNITED STATES PATENTS

| | | | |
|---|---|---|---|
| 2,636,899 | 4/1953 | Burrows et al. | 260—525 X |
| 2,647,141 | 7/1953 | Cavanaugh et al. | 260—524 |
| 2,712,550 | 7/1955 | Cheney et al. | 260—524 |
| 2,712,551 | 7/1955 | Himel et al. | 260—524 |
| 2,970,169 | 1/1961 | Friedlander et al. | 260—524 |

FOREIGN PATENTS

| | | |
|---|---|---|
| 655,074 | 7/1951 | Great Britain. |
| 698,734 | 10/1953 | Great Britain. |
| 766,564 | 1/1957 | Great Britain. |
| 814,733 | 6/1959 | Great Britain. |

LORRAINE A. WEINBERGER, *Primary Examiner.*

LEON ZITVER, *Examiner.*

M. S. JAROSZ, L. A. THAXTON, *Assistant Examiners.*

BEST AVAILABLE COPY

UNITED STATES PATENT OFFICE
CERTIFICATE OF CORRECTION

Patent No. 3,278,592                                         October 11, 1966

Hans Moell et al.

It is hereby certified that error appears in the above numbered patent requiring correction and that the said Letters Patent should read as corrected below.

Column 6, line 23, for "407" read -- 40% --.

Signed and sealed this 5th day of September 1967.

(SEAL)
Attest:

ERNEST W. SWIDER                           EDWARD J. BRENNER
Attesting Officer                                   Commissioner of Patents